US012562820B2

(12) United States Patent
    Gandewar et al.

(10) Patent No.:    US 12,562,820 B2
(45) Date of Patent:      Feb. 24, 2026

(54) SPUR CORRECTION

(71) Applicant: TEXAS INSTRUMENTS INCORPORATED, Dallas, TX (US)

(72) Inventors: Prasad Gandewar, Bangalore (IN); Karthikeyan Gunasekaran, Bangalore (IN); Jagannathan Venkataraman, Bangalore (IN); Rahul Sharma, Bangalore (IN); Chandrajit Debnath, Bangalore (IN); Goutham Ramesh, Bangalore (IN); Sarma Sundareswara Gunturi, Bangalore (IN); Kevin Dharmesh Arvadia, Bangalore (IN); Gannina Venkata Naga Karthik, Bangalore (IN); Rahul Yadav, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/427,900

(22) Filed: Jan. 31, 2024

(65) Prior Publication Data

US 2025/0247159 A1     Jul. 31, 2025

(51) Int. Cl.
    *H04B 15/00*        (2006.01)

(52) U.S. Cl.
    CPC .................................... *H04B 15/00* (2013.01)

(58) Field of Classification Search
    CPC ...................................................... H04B 15/00
    See application file for complete search history.

(56) References Cited

U.S. PATENT DOCUMENTS

| | | | |
|---|---|---|---|
| 6,693,980 B1 * | 2/2004 | Linder .................... | H03D 7/165 |
| | | | 329/304 |
| 7,280,061 B2 * | 10/2007 | Dias .................... | H03M 3/3283 |
| | | | 341/143 |
| 7,643,600 B2 * | 1/2010 | Maxim .................... | H03C 3/40 |
| | | | 375/345 |
| 11,533,068 B1 | 12/2022 | Sharma et al. | |
| 2007/0192391 A1 * | 8/2007 | McEwan ................. | G01S 7/285 |
| | | | 708/271 |
| 2019/0383924 A1 * | 12/2019 | Mehdizad Taleie .... | G01S 7/006 |

OTHER PUBLICATIONS

Machine translation of CN-106357241-A (Year: 2017).*

* cited by examiner

*Primary Examiner* — Jean B Corrielus
(74) *Attorney, Agent, or Firm* — Xianghui Huang; Frank D. Cimino

(57)            ABSTRACT

A circuit includes a mixer having a first input, a second input, and an output. A clock generator has an output coupled to the second input of the mixer. An analog-to-digital converter (ADC) has an input coupled to the output of the mixer and has an output. A spur estimator has a first input, a second input, and an output. The first input of the spur estimator is coupled to the output of the ADC. A spur modification circuit has a first input, a control input and an output. The first input of the spur modification circuit is coupled to the second input of the spur estimator, and the control input is coupled to the output of the spur estimator. A transmitter has an input coupled to the output of the spur modification circuit and has an output coupled to the first input of the mixer.

21 Claims, 8 Drawing Sheets

SPUR CORRECTION

BACKGROUND

A transmitter transmits a signal to a receiver. In some applications, the transmitter itself may introduce a spurious frequency (spur) into the transmitted signal at a known frequency. The receiver then receives the intended data signal as well as the unintended spur. The spur may cause aberrant behavior in the receiving system.

SUMMARY

In one example, a circuit includes a mixer having a first input, a second input, and an output. A clock generator has an output coupled to the second input of the mixer. An analog-to-digital converter (ADC) has an input coupled to the output of the mixer and has an output. A spur estimator has a first input, a second input, and an output. The first input of the spur estimator is coupled to the output of the ADC. A signal modification circuit has a first input, a control input and an output. The first input of the signal modification circuit is coupled to the second input of the spur estimator, and the control input is coupled to the output of the spur estimator. A transmitter has an input coupled to the output of the signal modification circuit and has an output coupled to the first input of the mixer.

In another example, a circuit includes a mixer having a first input, a second input, and an output. A numerically-controlled oscillator (NCO) has an output. An in-phase (I), quadrature phase (Q) digital-to-analog converter (IQ DAC) has an input coupled to the output of the NCO and has an output. A square wave generator has an input coupled to the output of the IQ DAC and has an output coupled to the second input of the mixer. An analog-to-digital converter (ADC) has an input coupled to the output of the mixer and has an output. A spur estimator has a first input, a second input, and an output. The first input of the spur estimator is coupled to the output of the ADC. A signal modification circuit has a first input, a control input and an output. The first input is coupled to the second input of the spur estimator. The control input is coupled to the output of the spur estimator. A transmitter has an input coupled to the output of the signal modification circuit and has an output coupled to the first input of the mixer.

In yet another example, a circuit includes a mixer having a first input, a second input, and an output. A clock generator has an output coupled to the second input of the mixer. An analog-to-digital converter (ADC) has an input coupled to the output of the mixer and has an output. A spur estimator has a first input, a second input, and an output. The first input of the spur estimator is coupled to the output of the ADC. The spur estimator is configured to estimate a magnitude and a phase of a frequency spur and to provide a control value at the output of the spur estimator based on the estimate of the magnitude and phase of the frequency spur. A signal modification circuit has a first input, a control input and an output. The first input is coupled to the second input of the spur estimator. The control input is coupled to the output of the spur estimator. A transmitter has an input coupled to the output of the signal modification circuit and has an output coupled to the first input of the mixer.

In another example, a circuit includes a digital signal generator having an output and an in-phase (I), quadrature phase (Q) digital-to-analog converter (IQ DAC) having an input coupled to the output of the digital signal generator and having an output. A square wave generator has an input coupled to the output of the IQ DAC.

DETAILED DESCRIPTION

Figure 1:
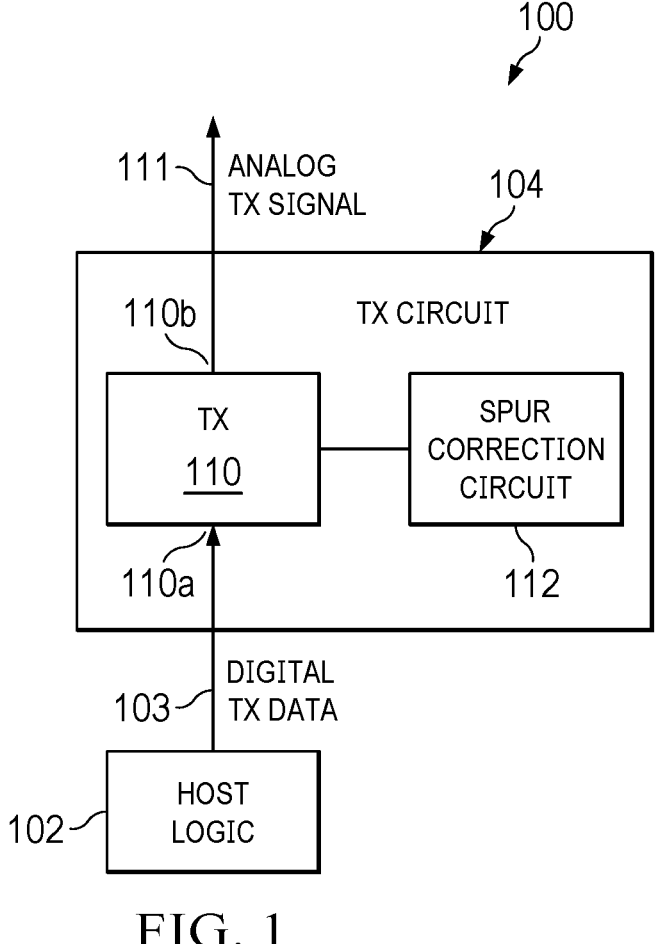
FIG. 1 is a block diagram of a system including a transmitter having a spur correction circuit, in an example.

The same reference numbers or other reference designators are used in the drawings to designate the same or similar (either by function and/or structure) features.

To support wider radio frequency (RF) bands, a digital-to-analog converter (DAC) in the system's transmitter may be operated in an interleave mode. In some cases, an in-phase (I), quadrature (Q) phase DAC may be used for improved image filtering. One or more spurs may be present in the transmitted signal. The frequency of each such spur is known apriori and is a function of the transmitter design. Limitation on the spurious free dynamic range (SFDR) of the transmitter's output frequency spectrum due to presence of constant frequency spurs can degrade the transmitter's error vector magnitude (EVM) specification. The examples described herein pertain to a transmitter that includes a spur correction circuit which determines (e.g., estimates) the magnitude and phase of the spurs at the output of the transmitter's DAC or coupling to the DAC output path. The spur correction circuit uses the estimated spurs to cause the digital transmit data to be modified to thereby attenuate the analog output spurs introduced by the transmitter's DAC or coupling to the DAC output path.

FIG. 1 is a block diagram of a system 100 including a transmitter having a spur correction circuit, in an example. System 100 includes host logic 102 coupled to a transmit circuit 104. In one example, host logic 102 and transmit circuit 104 may be provided on the same integrated circuit (IC). In another example, transmit circuit 104 may be provided on a different IC than host logic 102. Host logic 102 may include a digital circuit, a processor, a field programmable gate array, or other type of circuitry. Transmit circuit 104 includes a transmitter 110 coupled to a spur correction circuit 112. Transmitter 110 may include the DAC noted above. Transmitter 110 includes an input 110a and output 110b. Input 110a is coupled to host logic 102. Host logic 102 provides digital transmit data 103 to transmitter 110. Transmitter 110 may include a DAC to convert the digital transmit data 103 to an analog transmit signal 111 which may be transmitted through output 110b, e.g., by an antenna, to a receiving system (not shown). Transmitter 110 may be a wired or wireless transmitter. Unfortunately, transmitter 110 may introduce one or more spurs into the analog transmit signal 111. Spur correction circuit 112 determines the magnitude and phase of the spur(s) and then modifies the digital transmit data 103 to attenuate the amplitude of the output transmit signal's frequency at the frequency that the spur(s) would otherwise be present to, to a large extent, nullify the presence of the spur in the resulting analog transmit signal 111.

Figure 2:
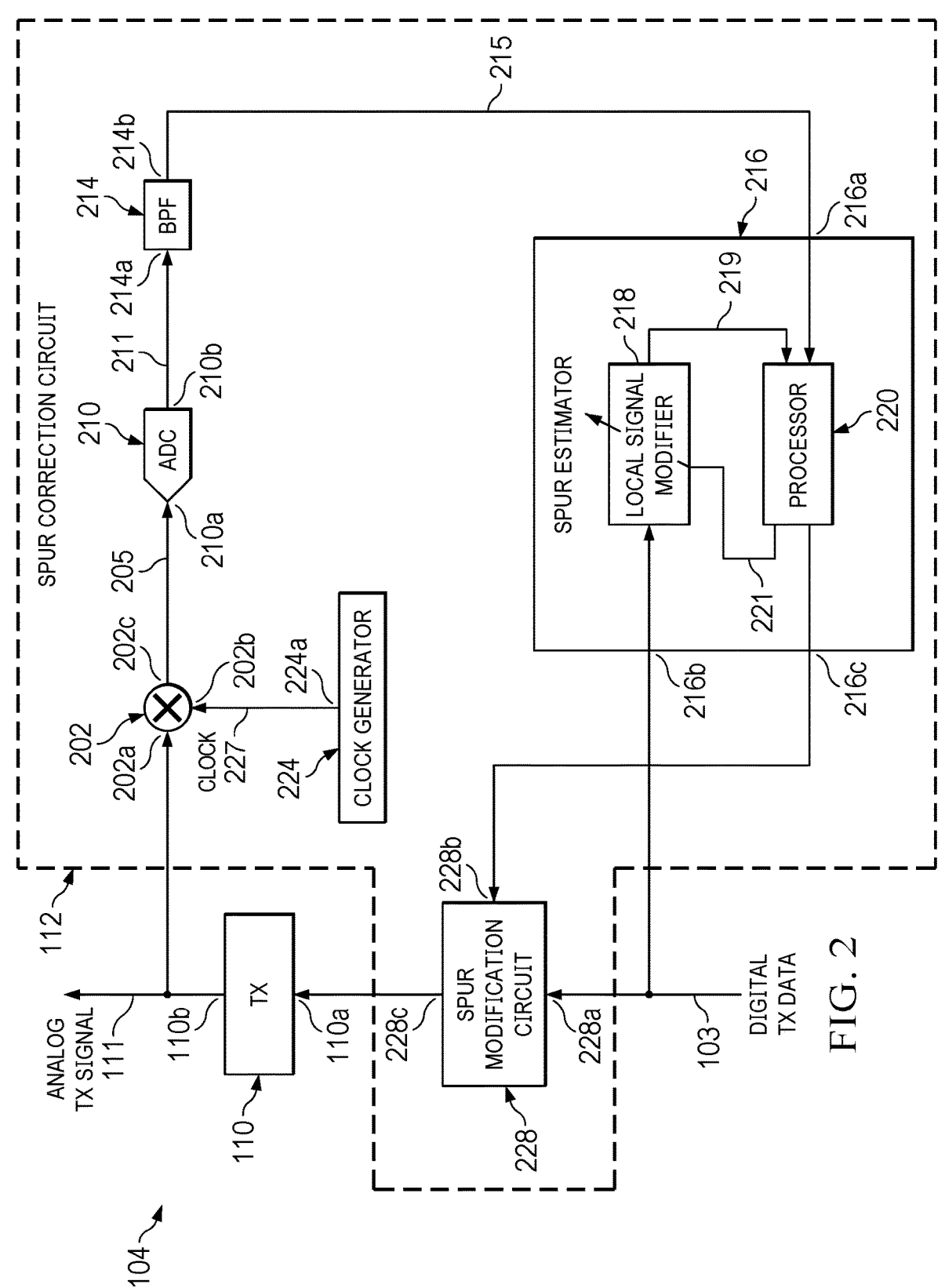
FIG. 2 is a block diagram of the spur correction circuit coupled to the transmitter in an example.

FIG. 2 is a block diagram of the spur correction circuit 112, in an example, coupled to transmitter 110. In this example, spur correction circuit 112 includes a mixer 202, an analog-to-digital converter (ADC) 210, a bandpass filter (BPF) 214, a spur estimator 216, a spur coefficient modification circuit 228, and a clock generator 224. Mixer 202 includes inputs 202a and 202b and output 202c. Clock Generator 224 has an output 224a. ADC 210 has an input 210a and an output 210b. BPF 214 has an input 214a and an output 214b. Spur estimator 216 has inputs 216a and 216b and an output 216c. Spur modification circuit 228 has inputs 228a and 228b and an output 228c. Digital transmit data 103 is provided to input 228a of spur modification circuit 228.

The output 110b of transmitter 110 is coupled to the input 202a of mixer 202. The output 224a of clock generator 224 is coupled to the input 202b of mixer 202. The output 202c of mixer 202 is coupled to the input 210a of ADC 210. The output 210b of ADC 210 is coupled to input 214a of BPF 214. The output 214b of BPF 214 is coupled to input 216a of spur estimator 216. The input 228a of spur modification circuit 228 is coupled to input 216b of spur estimator 216. Accordingly, the input 216b of spur estimator also receives the digital transmit data 103. The output 216c of spur estimator 216 is coupled to the input 228b of spur modification circuit 228. The output 228c of spur modification circuit 228 is coupled to the input 110a of transmitter 110.

Transmitter 110 includes a DAC, e.g., an in-phase (I), quadrature phase (Q) (IQ) DAC, that introduces a spur into the transmitted output signal 111. Spur correction circuit 112 downconverts the spur to a lower frequency, e.g., 1 MHZ, and determines the magnitude and phase, e.g., by a Fourier Transform, of the spur downconverted to the lower frequency. Spur correction circuit 112 then configures signal modification circuit 228 to modify the digital transmit data at the frequency corresponding to the spur based on the determination of its magnitude and phase. For example, spur correction circuit 112 may add a signal at the measured spur amplitude but at an inverted phase, e.g., measured phase plus or minus 180 degrees, so as to pre-attenuate the transmitted signal at the spur's frequency. As transmitter 110 adds the spur into the transmitted output signal, the magnitude of the signal at the frequency of the spur is reduced from what would have been absent spur correction circuit 112.

Mixer 202 mixes the transmitted output signal 111 with a clock signal (CLOCK) 227 from clock generator 224. In one example, the frequency of CLOCK 227 is the frequency of the spur (Fspur) to be reduced plus a lower frequency. In the examples described herein, the lower frequency is 1 MHz but can be other than 1 MHz in other examples. Accordingly, the frequency of CLOCK 227 is Fspur+1 MHz. The output signal 205 from mixer 202 includes a signal at 1 MHz. The signal 205 at 1 MHz from mixer 202 is predominantly due to the spur. A small portion of signal 205 may include a downconverted third harmonic of the spur, which may result from the output of the DAC in the transmitter 110.

ADC 210 converts signal 205 from an analog signal to a digital signal 211, which is then filtered by bandpass filter 214. The frequency band of bandpass filter may be approximately centered on 1 MHz. Bandpass filter 214 attenuates the signal at frequencies substantially lower or higher than 1 MHz. The filtered signal 215 (also referred to herein as the downconverted signal 215) from bandpass filter 214 is provided to input 216a of spur estimator 216.

Spur estimator 216 includes a local signal modifier 218, which is functionally equivalent to spur modification circuit 228, and a processor 220. In an example, local signal modifier 218 may be implemented by processor 220, e.g., through the execution of machine instructions on processor 220. After processor 220 has estimated the magnitude and phase of the spur, processor 220 may configure, via configuration signal 221, local signal modifier 218 to replicate the function performed by spur modification circuit 228 to fine-tune the modification being made to the digital transmit data 103 at the spur's frequency. In one example, processor 220 compares output signal 219 from the local signal modifier 218 to downconverted signal 215. If those two signals are approximately the same, e.g., within a threshold range of each other, then signal modification circuit 218 is adequately configured to null the spur. Otherwise, processor 220 may make small adjustments, e.g., iterative adjustments, to signal modification circuit 218 and spur modification circuit 228 in an attempt to make signals 219 and 215 approximately the same.

Figure 3:
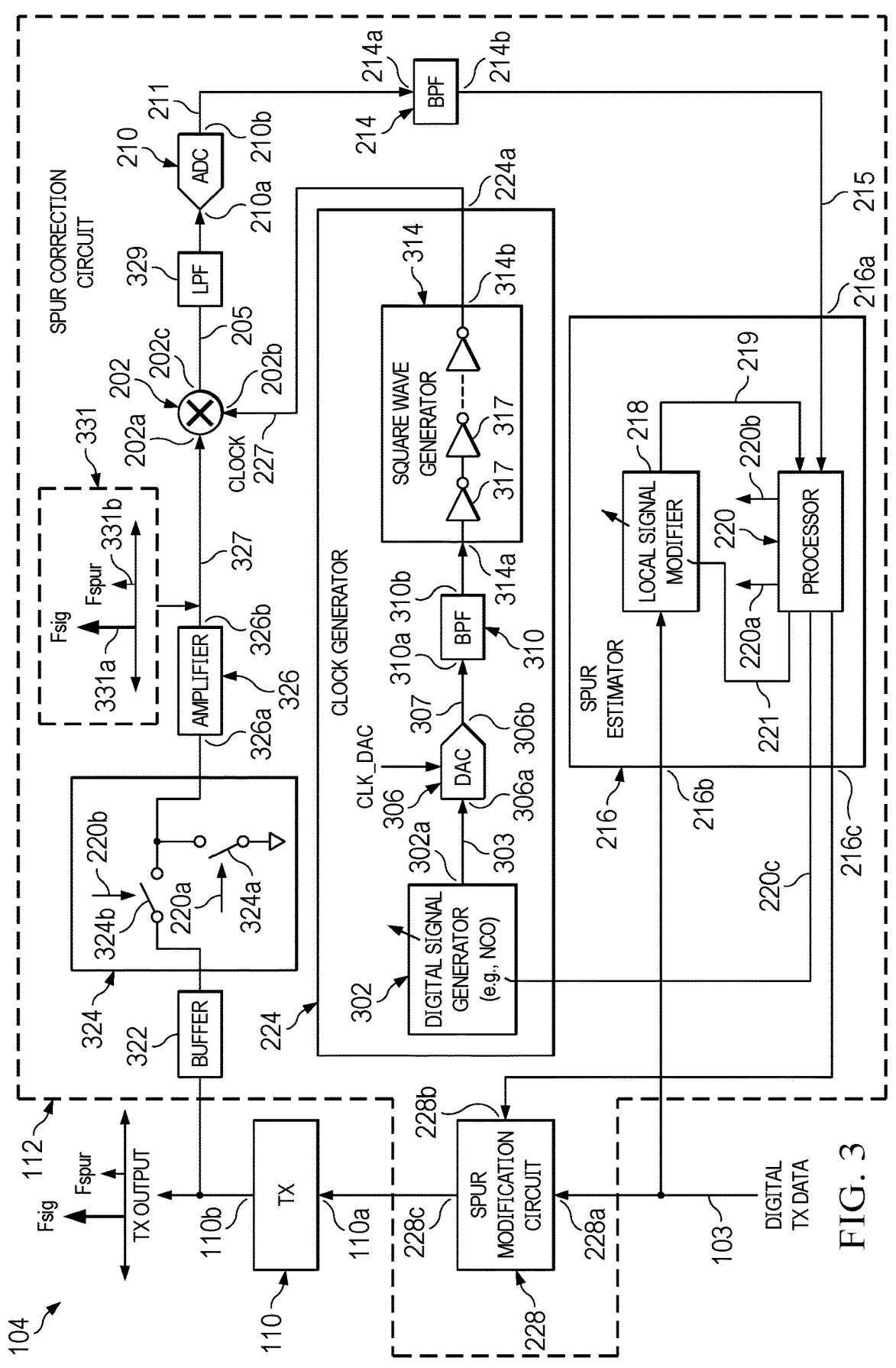
FIG. 3 is another block diagram of the spur correction circuit coupled to the transmitter in an example.

FIG. 3 is the block diagram of transmit circuit 104 but showing spur correction circuit 112 in greater detail. The illustrative spur correction circuit 112 of FIG. 3 includes a buffer 322, a switch circuit 324, amplifier 326, a low pass filter 329, the mixer 202, the ADC 210, the bandpass filter 214, the clock generator 224, the spur estimator 216, and the spur modification circuit 228. Buffer 322, switch circuit 324, and amplifier 326 are coupled in series between the output 110b of transmitter 110 and the input 202a of mixer 202. Buffer 322 has a relatively high input impedance so as not to substantially load the output 110b of transmitter 110. Switch circuit 324 includes switches (e.g., transistors) 324a and 324b controlled by control signals 220a and 220b from processor 220. Switch 324b is coupled between buffer 322 and the input 326a of amplifier 326. Switch 324a is coupled between the input 326a of amplifier 326 and a ground terminal. When closed, switch 324 electrically couples the output of buffer 322 to the input 326a of amplifier 326. When closed, switch 324a electrically couples the input 326a of amplifier 326 to ground. The output 326b of amplifier 326 is coupled to the input 202a of mixer 202. The output signal 327 from amplifier 326 has a frequency spectrum 331 that includes a frequency fsig 331a corresponding to the frequency of the data to be transmitted and a frequency fspur 331b of a spur generated by transmitter 110. Low pass filter 329 is coupled between the output 202c of mixer 202 and the input 210a of ADC 210.

In the example of FIG. 3, clock generator 224 includes a digital signal generator 302, a DAC 306, bandpass filter 310, and a square wave generator 314. In one example, digital signal generator 302 is a numerically-controlled oscillator (NCO) and is referred to herein as NCO 302. NCO 302 has an output 302a that is coupled to the input 306a of DAC 306, and DAC 306 has an output 306b that is coupled to an input 310a of bandpass filter 310. Bandpass filter 310 has an output 310b that is coupled to an input 314a of square wave generator 314. Square wave generator 314 has an output 314b that is coupled to the output 224a of clock generator 224 and to the input 202b of mixer 202.

NCO 302 generates a digital sinusoidal output signal 303 at a fundamental frequency that can be programmed by processor 220 via a control signal 220c. In one example, the fundamental frequency of the digital sinusoidal output signal 303 is 1 MHz, but it can be other than 1 MHz as desired. The DAC 306 receives a clock, CLK_DAC, to control its operation. In one example, the frequency of CLK_DAC is 3 GHZ. DAC 306 converts the digital sinusoidal output signal 303 to an analog signal 307, and bandpass filter 310 filters the output signal 307 to produce an output signal 311. In this example, square wave generator 314 includes one or more inverters 317, e.g., coupled together in series. Square wave generator 314 converts the output signal 311 to a square wave (clock 227), which is then used by mixer 202 to downconvert output signal 327 from amplifier 326 to a lower frequency for subsequent processing by spur estimator 216.

Figure 4:
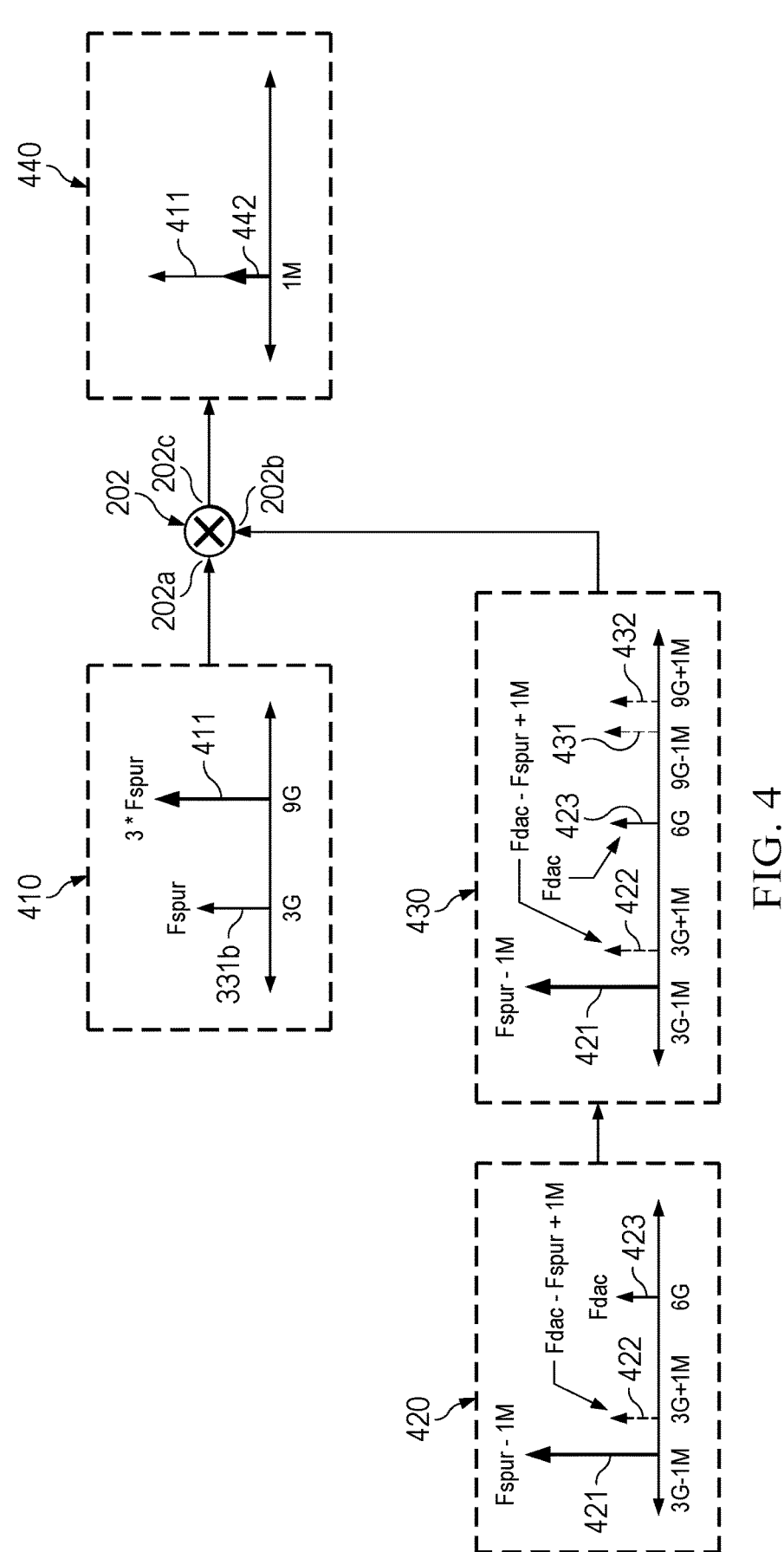
FIG. 4 includes frequency graphs illustrating the operation of the spur correction circuit, in an example.

FIG. 4 includes example frequency plots 410, 420, 430, and 440 of the signals described above. Frequency plot 410 represents the frequencies in the input signal of mixer 202 at mixer input 202a. The frequencies include fspur 331b as well as a frequency 411 which is a third harmonic of fspur present in the 104. Frequency fsig 331a is not shown in frequency plot 410. Frequency plot 420 represents the frequency spectrum of output signal 307 from DAC 306 and includes frequencies 421, 422, and 423. Frequency 423 is a second harmonic of CLK_DAC. In the example in which CLK_DAC is 3 GHZ, frequency 423 is 3*2 GHz, which is 6 GHz. Frequency 421 is (fspur-1 MHz). Frequency 422 is (CLK_DAC-fspur+1 MHz), which is (fspur+1 MHz) in this example.

Frequency plot 430 represents the frequency spectrum of clock 227 from square wave generator 314. Frequency plot 430 includes the frequencies 421, 422, and 423, described above, as well as third harmonic frequencies 431 and 432 of frequencies 421 and 422, respectively. The third harmonic frequencies 431 and 432 are created by the signal chain including DAC 306, BPF 310, and square wave generator 314.

If DAC 306 is implemented as an IQ DAC, the magnitude of the signal at frequency 422 (fspur+1 MHz) is substantially smaller than the magnitude of the signal at frequency 421 (fspur-1 MHz), as illustrative by the relative heights of the arrows at frequencies 421 and 422. Further, by implementing DAC 306 as an IQ DAC, the magnitudes of the signals at third harmonic frequencies 431 and 432 also are relatively small.

Frequency plot 440 represents the frequency spectrum of output signal 205 from mixer 202. The signal at frequencies of fspur 331b and 411 (its third harmonic) are downconverted to 1 MHz as represented by arrows 441 and 442, respectively, in frequency plot 440. Advantageously, because the magnitude of the signal at frequencies 422 is small, the third harmonics 431, and 432 of clock 227 are relatively small. Accordingly, the signal at frequency 1 MHz in frequency plot 440 is predominantly the downconverted version of signal at fspur 331b and only a small portion of the signal is due to the downconversion of frequency 411, as illustrated graphically by the size of arrow 441 being substantially larger than the size of arrow 442. Accordingly, by DAC 306 being an IQ DAC, the resulting tone at 1 MHz is dominated by fspur 331b.

Figure 5:
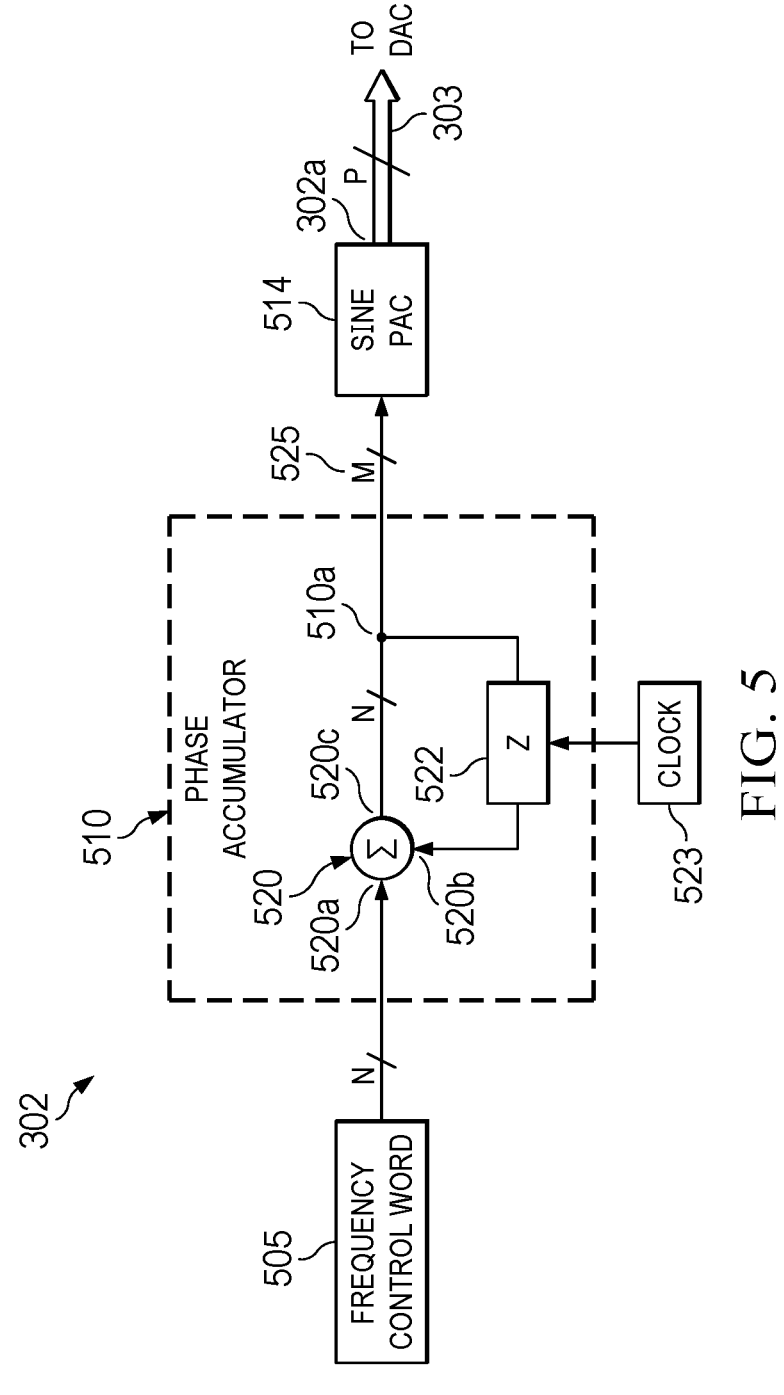
FIG. 5 is a block diagram of an NCO, in an example.

FIG. 5 is a block diagram of NCO 302, in an example. NCO 302 includes a phase accumulator 510 coupled to a phase-to-amplitude converter 514. The phase accumulator 510 includes an adder 520 and a register 522. Adder 520 includes input 520a and 520b and an output 520c. A frequency control word 505 is provided through the control signal 220c (FIG. 3) to input 520a of adder 520. The output value at output 520c from adder 520 is stored in register 522. Upon each cycle of a clock 523, the value stored in register 522 is provided to input 520b of adder and added to the frequency control word 505. The output 520c of adder 520 is coupled to an input 514a of phase-to-amplitude converter 514. Phase-to-amplitude converter 514 may include a memory (e.g., read-only memory) that stores a look-up table containing 2M contiguous samples of the output digital sinusoidal waveform of NCO 302.

When clocked, e.g., by clock 523, the phase accumulator may create a modulo-2~ sawtooth waveform which is then converted by phase-to-amplitude converter 514 to a sampled sinusoid, where N is the number of bits carried in the phase accumulator 510. The value N sets the frequency resolution of NCO 302 and may be larger than the number of bits defining the memory space of the look-up table in the phase-to-amplitude converter 514. If the capacity of the phase-to-amplitude converter 514 is 2M, the phase accumulator's output word can be truncated to M bits as indicated at 525. In some examples, the truncated bits can be used for interpolation. The phase-to-amplitude converter 514 uses the truncated output word from the phase accumulator 510 as an index into its look-up table to thereby output the next digital sample of the digital sinusoidal output signal 303.

Figure 6:
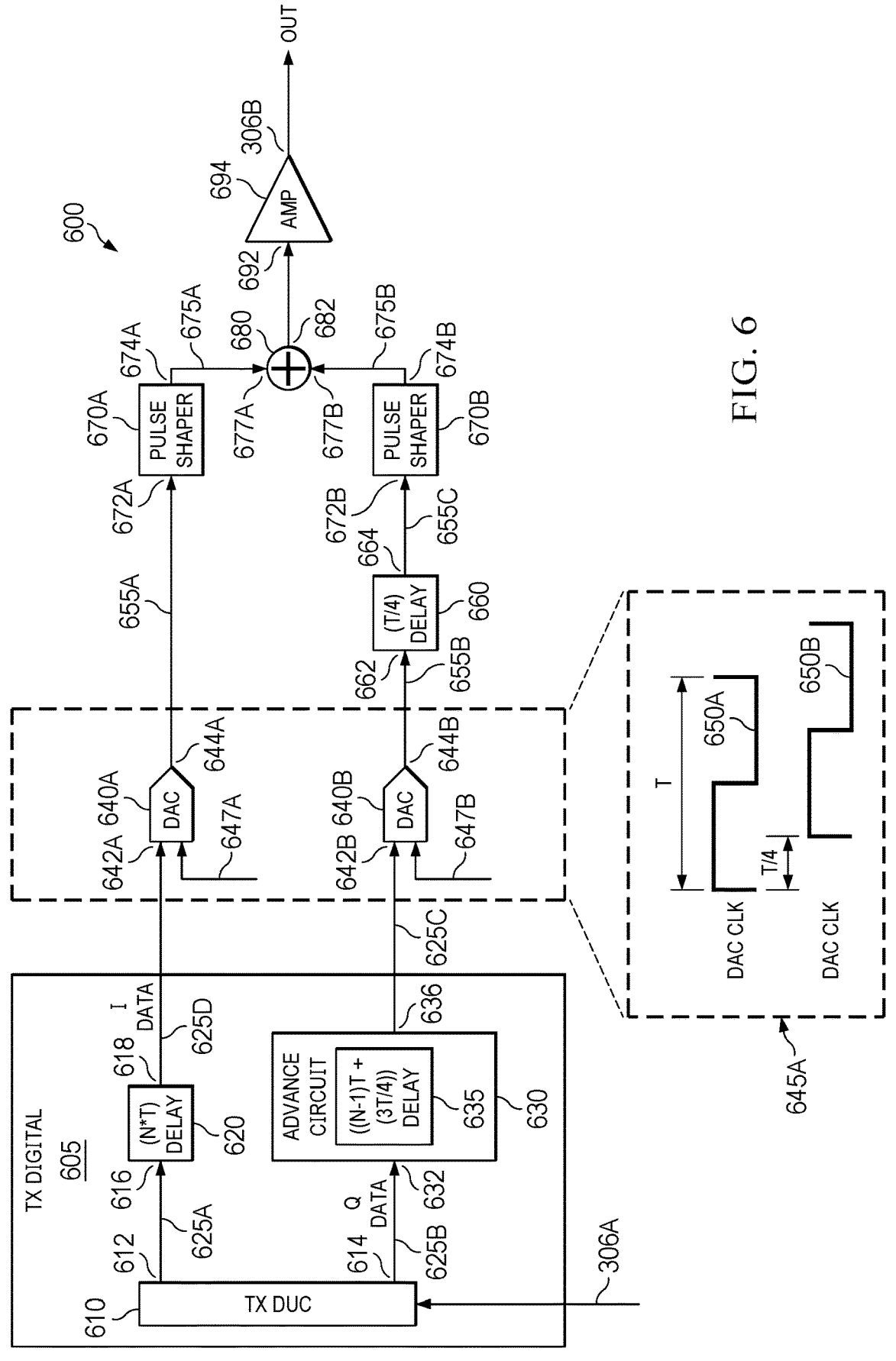
FIG. 6 is a block diagram of an IQ DAC usable to implement a DAC.

FIG. 6 is a block diagram of an IQ DAC 600 usable to implement DAC 306. The IQ DAC 600 includes a digital TX 605, two return-to-zero (RZ) DACs 640A and 640B, a delay circuit 660, two pulse shapers 670A and 670b, an adder 680, and an amplifier) 694. The digital TX 605 includes a digital upconverter (DUC) 610, a delay circuit 620, and an advance circuit 630. DUC 610 has input 306a, a first output 612 and a second output 114. TX DUC 610 receives a signal to be transmitted at input 306a and converts the signal received at input 306a into its I and Q components. The first output 612 is for the I data signal 625A, and the second output 614 is for the Q data signal 625B. The delay circuit 620 and the advance circuit 630 are digital timing offset circuits that adjust the I data signal 625A and the Q data signal 625B, respectively, such that the time-advanced Q data signal 625C has a time advancement relative to the delayed I signal 625D. The delay circuit 660 is an analog timing offset removal circuit.

The delay circuit 620 has an input 616 coupled to the output 612 of the DUC 610. The delay circuit 620 has an output 618 for the delayed I data signal 625D. The advance circuit 630 has an input 632 coupled to the output 614 of the DUC 610. The advance circuit 630 has an output 636 for the time-advanced Q data signal 625C. In this example implementation, the delay circuit 620 introduces a larger delay of a number N times the period T (N*T), and the advance circuit 630 introduces a smaller delay 635 of;

$$\left( (N-1)*T + \left( \frac{3*T}{4} \right) \right)$$

Accordingly, the delay circuit 620 introduces a larger delay into the I data signal than the smaller delay that advance circuit 630 introduces into the Q data signal, such that the time-advanced Q data signal 625C is one-fourth of T advanced relative to the N*T delayed I data signal 625D.

Any appropriate technique for advancing the Q data signal 625B relative to the I data signal 625A can be used. For example, the delay circuit 620 can introduce a delay of the period T times the sum of a number N plus one-fourth, and the advance circuit 630 can introduce a smaller delay of N times T. The length of the time advancement can be set (e.g. to one-fourth of T) to reduce the magnitude of image artifacts at odd harmonics of a sampling frequency fs of RZ DACs 640A and 640B. The delayed I data signal 625D is provided to the input 642A of the RZ DAC 640A, and the time-advanced Q) data signal 625C is provided to the input 642B of the RZ DAC 640B.

RZ DACs 640A and 640B operate at a sampling frequency fs equal to the digital data rate. As illustrated in offset 645A, the RZ DACs 640A and 640B operate based on clock signals DAC CLKs 650A and 650B, respectively. RZ DAC 640A receives the clock signal DAC CLK 650A at an input 647A, and RZ DAC 640B receives the clock signal DAC CLK 650B at an input 647B. The clock signals DAC CLKs 650A and 650B are offset by one-fourth the period T of the clock signal relative to each other. The T/4 offset between DAC CLKs 650A and 650B matches the T/4 offset between the delayed I data signal 625D and the time-advanced Q data signal 625C and removes the need for a fractional phase locked loop acting as a shared local oscillator for the I and Q data signals, thereby reducing the area and power used by RF sampling transmitter 600A. In addition, removing the need for a local oscillator also removes the need for image-reject filters to reduce the magnitude of images introduced by the local oscillator.

RZ DAC 640A outputs the analog I signal 655A through output 644A, which is coupled to an input 672A of the pulse shaper 670A. RZ DAC 140B outputs the analog Q signal 655B through output 644B, which is coupled to the input 662 of the T/4 delay circuit 660. The delay circuit 660 cancels out the time advance (e.g. the T/4 or T/8 time advance as discussed above) introduced by advance circuit 630 and outputs the delayed Q signal 655C through output 664, which is coupled to the input 672B of the pulse shaper 670B. Any appropriate pulse shape may be used to boost the desired frequency content for a particular implementation. The pulse shaper 670A outputs the pulse-shaped I signal 675A through output 674A, which is coupled to an input 677A of the adder 680. The pulse shaper 670B outputs the pulse-shaped Q signal 675B through output 674B, which is coupled to an input 677B of the adder 680.

The pulse-shaped I signal 675A and the pulse-shaped Q signal 675B are combined together by adder 680 to generate an intermediate frequency (IF) signal 684, which is output through an output 682 of the adder 680. Adder 680 adds the I signal 675A and Q signal 675B to reduce above-band image artifacts, or subtracts the Q signal 675B from the I signal 675A to reduce below-band image artifacts. Adder 680 can be programmed by the user to perform the add operation or the subtract operation based on the desired performance of the RF sampling transmitter 600A. An input 692 of amplifier 694 is coupled to the output 682 of the adder 680. Amplifier 694 amplifies the signal from adder 680 and provides an output signal at output 306b.

Figure 7:
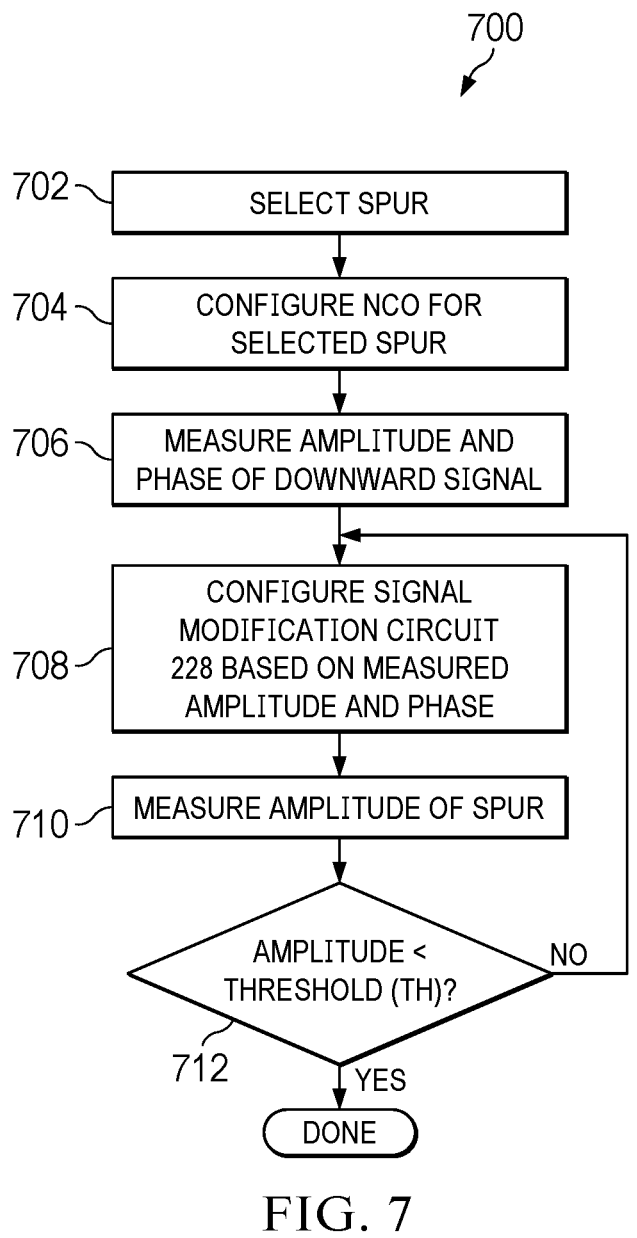
FIG. 7 is an example flow diagram illustrating the operation of the spur correction circuit of the example of FIG. 3.

FIG. 7 is an example flow diagram 700 illustrating the operation of spur correction circuit 112 of the example of FIG. 3. At operation 702, a spur is selected, e.g., by processor 220. The spur's frequency is known apriori and programmed into processor 220 or otherwise accessible to processor 220. In some examples, the machine instructions executed by processor 220 may be programmed with the frequency of the spur. In other examples, a memory or register accessible to processor 220 may be present and contain the frequency of the spur. Processor 220 configures NCO 302 via control signal 220c, for a particular frequency. For example, if the frequency of CLK_DAC for DAC 306 is 3 GHz and the target frequency 421 is 2.9 GHZ, then processor 220 configures NCO 302 for 0.1 GHz.

At 704, processor 220 measures the amplitude and phase of the downconverted signal (e.g., filtered signal 215). In one example, processor 220 may perform a Fourier Transform to measure the amplitude and phase. Upon determining the amplitude and phase of the downconverted signal, at 706 processor 220 configures the signal modification circuit 228 based on the measured amplitude and phase. For example, processor 220 may cause the signal modification signal 228 to add the measured amplitude to the digital transmit data 103 but at a phase that is 180 degrees apart from the measured phase (phase +/−180).

At 710, processor 220 again measures the amplitude of the spur and compares, e.g., by decision operation 712, the measured amplitude to a relatively low threshold Th. If the measured amplitude is not less than the threshold Th, then control loops back to operation 708, and the processor 220 adjusts the configuration of the signal modification circuit 228. Otherwise, if the measured amplitude is equal to or less than the threshold Th, then process ends and the signal modification circuit 228 has been adequately configured to null or mostly null the effects of the spur introduced by transmitter 110.

Figure 8:
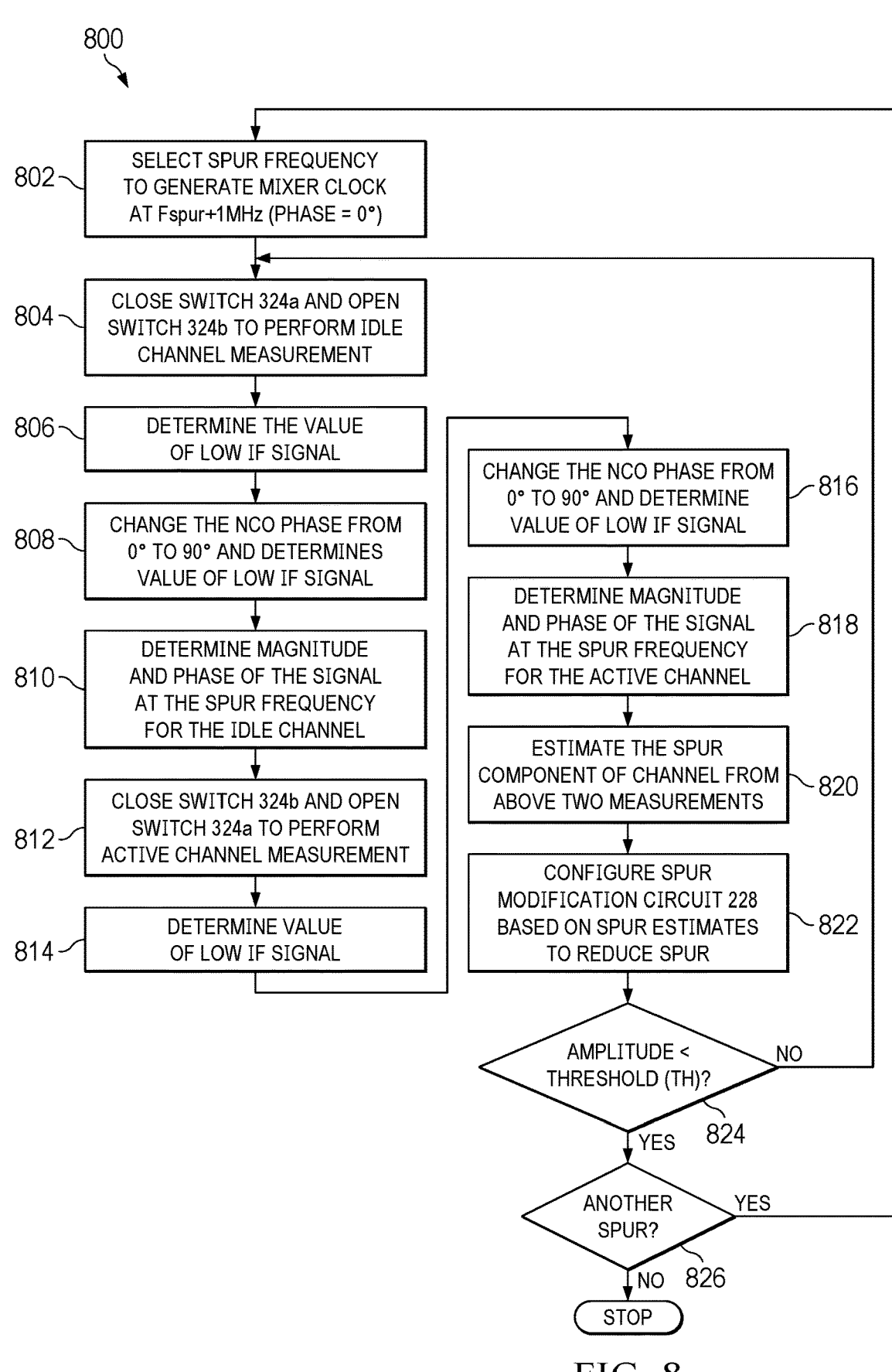
FIG. 8 is another example flow diagram illustrating the operation of the spur correction circuit of the example of FIG. 3.

FIG. 8 is another example flow diagram 800 illustrating the operation of spur correction circuit 112 of the example of FIG. 3. Flow diagram 800 includes operations 802-826, which can be performed in the order shown or in a different order. In operation 802, a frequency for a spur is selected. As noted above, the frequency of each spur is known apriori. In some cases, only a single spur is present while in other examples, multiple spurs, each at a different frequency, are present. In some examples, the machine instructions executed by processor 220 may be programmed with the frequency of each spur. In other examples, a lookup table or register accessible to processor 220 may be present and contain the frequency of each spur. NCO 302 is configured, e.g., by processor 220 via control signal 220c, for a particular frequency (e.g., 1 MHz) and at a phase of 0 degrees.

In operation 804, processor 220 closes switch 324a and opens switch 324b by way of control signals 220a and 220b, respectively. With switch 324a closed, the input 326a of amplifier 326 is coupled to ground. By coupling the input of amplifier 326 to ground, spur estimator 216 determines the magnitude and phase at the frequency of the selected spur with a grounded input, referred to as an "idle channel" measurement." The idle channel measurement enables processor 220 to determine the magnitude and phase of the signal at the spur frequency due to, e.g., noise.

In operation 806, processor 220 determines the value of the intermediate frequency (IF) signal (e.g., the 1 MHz signal described above) for the idle channel. In operation 808, processor 220 reconfigures NCO 302 from 0 degrees to 90 degrees and again determines the value of the IF signal. Processor 220 may reconfigure NCO 302 from 0 degrees to 90 degrees by changing the initial phase of NCO by 90 degrees. From the two idle channel determinations from operations 706 and 808, in operation 810, processor 220 determines the magnitude and phase of the signal at the selected spur frequency for the idle channel. At 0 degrees (Eq. 1 below) and at 90 degrees (Eq. 2 below) for NCO 302, spur estimator 216, e.g., processor 220, calculates:

$$\cos((\omega_s + (2)(\pi) * 1M)t + 0°) * A\cos(\omega_s t + \phi) = \qquad \text{Eq. (1)}$$

$$A\cos(2 * pi * 1M * t - \phi)$$

$$\cos((\omega_s + (2)(\pi) * 1M)t + 90°) * A\cos(\omega_s t + \phi) = \qquad \text{Eq. (2)}$$

-continued $$A\sin(2*pi*1M*t - \phi)$$

Spur Estimator 216 may then calculate the amplitude A and phase φ as:

$$A = \sqrt{(Eq.\ 1\ \text{result})^2 + (Eq.\ 2\ \text{result})^2} \quad \text{(Eq. 3)}$$

$$\phi = \tan^{-1}\left(\frac{Eq.\ 2\ \text{result}}{Eq.\ 1\ \text{result}}\right) \quad \text{(Eq. 4)}$$

In operation 812, processor 220 closes switch 324b and opens switch 324a to perform an "active channel" measurement, which is a determination of the magnitude and phase of the spur contained in the transmitter's output signal. With switch 324b open, the output 110b of transmitter 110 is electrically coupled through buffer 322 to amplifier 326.

Spur estimator 216 performs the same operations with switch 324b closed as it did with switch 324a closed, as described above. In operation 814, processor 220 determines the value of the IF signal for the idle channel. In operation 816, processor 220 reconfigures NCO 302 from 0 degrees to 90 degrees and again determines the value of the IF signal. From the two active channel determinations from operations 814 and 816, in operation 818, processor 220 determines (e.g., estimates) the magnitude and phase of the signal at the selected spur frequency for the active channel, e.g., per Eqs. 1-4 above.

In operation 820, processor 220 estimates the spur component of the transmitter's output signal based on the idle channel magnitude and phase determination (from operation 810) and the active channel magnitude and phase determination (from operation 818). For example, processor 220 subtracts the idle channel magnitude and phase from the corresponding magnitude and phase of the active channel. In operation 822, processor 220 configures, as described above, the spur modification circuit 228 based on the estimate of spur magnitude and phase from operation 820. In decision operation 824, processor 220 determines whether the magnitude of the spur less than the threshold Th. If the spur magnitude is greater than Th, then control loops back to operation 804. Otherwise, if the measured amplitude is equal to or less than the threshold Th, then in operation 826, processor 220 determines if another spur is present to be estimated. If another spur is present, then control loops back to operation 802 and the new spur frequency is selected. If all spurs have been estimated, then the process ends.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

In this description, unless otherwise stated, "about," "approximately" or "substantially" preceding a parameter means being within +/−10 percent of that parameter or, if the parameter is zero, a reasonable range of values around zero.

Modifications are possible in the described examples, and other examples are possible, within the scope of the claims.

What is claimed is:

1. A circuit, comprising:
a mixer having a first input, a second input, and an output;
a clock generator having an output coupled to the second input of the mixer;
an analog-to-digital converter (ADC) having an input coupled to the output of the mixer, and having an output;
a spur estimator having a first input, a second input, and an output, the first input of the spur estimator coupled to the output of the ADC;
a spur modification circuit having a first input, a control input and an output, the first input of the spur modification circuit coupled to the second input of the spur estimator, the control input of the spur modification circuit coupled to the output of the spur estimator; and
a transmitter having an input coupled to the output of the spur modification circuit, and having an output coupled to the first input of the mixer.

2. The circuit of claim 1, wherein the clock generator includes a numerically-controlled oscillator.

3. The circuit of claim 1, wherein the clock generator includes an in-phase (I), quadrature phase (Q) digital-to-analog converter (IQ DAC).

4. The circuit of claim 1, wherein the clock generator includes:
a numerically-controlled oscillator (NCO) having an output; and
an in-phase (I), quadrature phase (Q) digital-to-analog converter (IQ DAC) having a first input coupled to the output of the NCO, and having an output coupled to the second input of the mixer.

5. The circuit of claim 4, further comprising one or more inverters coupled in series between the output of the IQ DAC and the second input of the mixer.

6. The circuit of claim 1, wherein the spur estimator includes a processor configured to:
determine a first magnitude and a first phase for an idle channel;
determine a second magnitude and a second phase for an active channel;

estimate a third magnitude and a third phase based on the first and second magnitudes and first and second phases; and provide a control value to the control input of the spur modification circuit based on the third magnitude and third phase.

7. The circuit of claim 6, further comprising:

a first switch coupled between the output of the transmitter and the first input of the mixer; and a second switch coupled between the first input of the mixer and a ground terminal;

wherein the processor is configured to close the second switch when determining the first magnitude and first phase for the idle channel, and the processor is configured to close the first switch when determining the second magnitude and second phase for the active channel.

8. A circuit, comprising:

a mixer having a first input, a second input, and an output;

a numerically-controlled oscillator (NCO) having an output;

an in-phase (I), quadrature phase (Q) digital-to-analog converter (IQ DAC) having an input coupled to the output of the NCO, and having an output;

a square wave generator having an input coupled to the output of the IQ DAC, and having an output coupled to the second input of the mixer;

an analog-to-digital converter (ADC) having an input coupled to the output of the mixer, and having an output;

a spur estimator having a first input, a second input, and an output, the first input of the spur estimator coupled to the output of the ADC;

a spur modification circuit having a first input, a control input and an output, the first input coupled to the second input of the spur estimator; the control input coupled to the output of the spur estimator; and a transmitter having an input coupled to the output of the spur modification circuit, and having an output coupled to the first input of the mixer.

9. The circuit of claim 8, wherein the square wave generator includes one or more inverters coupled in series between the output of the IQ DAC and the second input of the mixer.

10. The circuit of claim 8, wherein the spur estimator includes a processor configured to:

determine a first magnitude and a first phase for an idle channel;

determine a second magnitude and a second phase for an active channel;

estimate a third magnitude and a third phase based on the first and second magnitudes and first and second phases; and provide a control value to the control input of the spur modification circuit based on the third magnitude and third phase.

11. The circuit of claim 10, further comprising:

a first switch coupled between the output of the transmitter and the first input of the mixer; and a second switch coupled between the first input of the mixer and a ground terminal;

wherein the processor is configured to close the second switch when determining the first magnitude and first phase for the idle channel, and the processor is configured to close the first switch when determining the second magnitude and second phase for the active channel.

12. A circuit, comprising:

a mixer having a first input, a second input, and an output;

a clock generator having an output coupled to the second input of the mixer;

an analog-to-digital converter (ADC) having an input coupled to the output of the mixer, and having an output;

a spur estimator having a first input, a second input, and an output, the first input of the spur estimator coupled to the output of the ADC, the spur estimator configured to estimate a magnitude and a phase of a frequency spur and to provide a control value at the output of the spur estimator based on the estimate of the magnitude and phase of the frequency spur;

a spur modification circuit having a first input, a control input and an output, the first input coupled to the second input of the spur estimator; the control input coupled to the output of the spur estimator; and a transmitter having an input coupled to the output of the spur modification circuit, and having an output coupled to the first input of the mixer.

13. The circuit of claim 12, wherein the mixer is configured to downconvert a signal at the first input of the mixer from a first frequency to a second frequency, the second frequency smaller than the first frequency.

14. The circuit of claim 13, wherein the clock generator includes a numerically-controlled oscillator (NCO) having an output and configured to generate a signal at the output of the NCO at the second frequency.

15. The circuit of claim 14, wherein the clock generator includes:

a digital-to-analog converter (DAC) having an input coupled to the output of the NCO, and having an output; and a square wave generator coupled between the output of the DAC and the second input of the mixer.

16. The circuit of claim 15, wherein the DAC is an in-phase (I), quadrature phase (Q) digital-to-analog converter (IQ DAC).

17. The circuit of claim 12, wherein the spur estimator is configured to:

determine a first magnitude and a first phase for an idle channel;

determine a second magnitude and a second phase for an active channel;

estimate a third magnitude and a third phase based on the first and second magnitudes and first and second phases; and provide a control value to the control input of the spur modification circuit based on the third magnitude and third phase.

18. A circuit, comprising:

a digital signal generator having an output;

an in-phase (I), quadrature phase (Q) digital-to-analog converter (IQ DAC) having an input coupled to the output of the digital signal generator, and having an output; and a square wave generator having an input coupled to the output of the IQ DAC;

an analog-to-digital converter (ADC) having an input coupled to an output of the square wave generator;

a spur estimator having a first input coupled to the output of the ADC; and a spur modification circuit having a first input coupled to a second input of the spur estimator, and a control input coupled to an output of the spur estimator.

19. The circuit of claim 18, wherein the digital signal generator is a numerically-controlled oscillator.

20. The circuit of claim 18, wherein the square wave generator includes one or more inverters coupled in series.

21. The circuit of claim 18, further comprising a mixer having an input coupled to the output of the IQ DAC, and an output coupled to the input of the ADC.

* * * * *